United States Patent [19]
Charbonnel et al.

[11] Patent Number: 5,328,328
[45] Date of Patent: Jul. 12, 1994

[54] SEALING DEVICE BETWEEN BLADE STAGES AND A ROTARY DRUM, PARTICULARLY FOR PREVENTING LEAKS AROUND THE STAGES OF STRAIGHTENER BLADES

[75] Inventors: Jean-Louis Charbonnel, Le Mee sur Seine; Jean-Christophe M. J. M. Cordier, Melun; Corrine G. Delahaye, Mormant; Jean-Claude L. Delonge, Corbeil Essonnes; Guy F. P. Dusserre-Telmon, Sivry Courtry; Jean-Pierre Galivel, Savigny le Temple; Laurent Gille, Melun; Jacky S. Naudet, Bondoufle; Didier M. L. Nouveau, Dammarie les Lys; Thierry H. M. Tassin, Brunoy; Gérard R. E. R. Vermont, Coubert, all of France

[73] Assignee: Societe Nationale d'Etude et de Construction de Moteurs d'Aviation "SNECMA", Paris, France

[21] Appl. No.: 64,431

[22] Filed: May 21, 1993

[30] Foreign Application Priority Data

May 27, 1992 [FR] France ................. 92 06475

[51] Int. Cl.5 .................................. F01D 11/00
[52] U.S. Cl. ................. 415/173.7; 415/160; 415/170.1; 415/174.3; 415/174.5
[58] Field of Search ............. 415/170.1, 173.1, 173.3, 415/173.4, 173.5, 173.7, 174.3, 174.4, 174.5, 160

[56] References Cited

U.S. PATENT DOCUMENTS

| | | |
|---|---|---|
| 3,079,128 | 2/1963 | Burge . |
| 3,460,843 | 8/1969 | Jaeger ..................... 415/170.1 |
| 4,375,292 | 3/1983 | Ericson . |
| 4,659,289 | 4/1987 | Kalogeros ................ 415/173.7 |
| 4,773,817 | 9/1988 | Stangalini et al. ........ 415/173.7 |
| 4,995,620 | 2/1991 | Zawaski et al. . |
| 5,074,748 | 12/1991 | Hagle ..................... 415/170.1 |

FOREIGN PATENT DOCUMENTS

| | | |
|---|---|---|
| 358410 | 2/1906 | France . |
| 379209 | 10/1907 | France . |
| 0780137 | 7/1957 | United Kingdom ........ 415/173.4 |
| 1020900 | 2/1966 | United Kingdom ........ 415/173.3 |

Primary Examiner—Edward K. Look
Assistant Examiner—Christopher Verdier
Attorney, Agent, or Firm—Oblon, Spivak, McClelland, Maier & Neustadt

[57] ABSTRACT

A device for ensuring the sealing in a rotary machine between a rotor and fixed blade stages.

Blade edges are joined by rings carrying circular seals in slots. Springs force the seals in the longitudinal direction towards transverse faces of reinforcements of the rotor.

A turbulence-free gas flow is obtained as a result of the total seal obtained by the seals (19). Moreover, the rotor can be constructed with a substantially rectilinear ferrule which only induces limited stress concentrations.

9 Claims, 4 Drawing Sheets

SEALING DEVICE BETWEEN BLADE STAGES AND A ROTARY DRUM, PARTICULARLY FOR PREVENTING LEAKS AROUND THE STAGES OF STRAIGHTENER BLADES

BACKGROUND OF THE INVENTION

Field of the Invention

The present invention relates to a device for ensuring a sealing action between blade stages and a drum rotating with respect thereto. It can be used in aircraft engine compressors.

DISCUSSION OF THE RELATED ART

Such machines have a drum-like rotor and a stator surrounds the latter so as to define therewith an annular gas flow stream or filament. The latter is occupied by mobile blade stages rotating with the rotor and which alternate with fixed blade stages connected to the stator and which serve to straighten the gas flow following the passage of the latter through the sideways inclined mobile blade stages.

It is appropriate for the fixed blades to extend over virtually the entire thickness of the annular stream or filament in order to prevent the gases leaking between the edge of the blades and the rotor. However, the operating conditions of the motor and in particular the temperatures vary considerably under different operating conditions and different thermal expansions could give rise to friction with catastrophic consequences for the rotor on the edges of the fixed blades. It is therefore necessary to accept a minimum clearance at this location, which implies relatively significant efficiency losses.

A design adopted in a motor or engine which has already been constructed is assumed to give better results by almost entirely preventing leaks. It is shown in FIG. 1 and the fixed blades 1 of each stage have their side edges 2 joined by a ring 3. The rotor 4 rotating about the axis X is then formed by a ferrule 5, whose generatrix is substantially rectilinear, in order to avoid stress concentrations, and on which are formed circular flanges containing recesses 7 for the insertion of the feet 8 of mobile blades 9. Reinforcements 10 extend between consecutive flanges 6 and the opening of the rings 3 are flush, so as to form with the outer faces 11 of the flanges 6 a substantially smooth, continuous surface, which permits a regular flow in the stream or filament. The bottom of each reinforcement 10 carries circular crests 12 directed towards the rings 3. The latter are covered with an easy wear material 13, which can be a honeycomb structure. The height of the crests 12 and the thickness of the material 13 are chosen in such a way that the crests 12 rub against the material 13 and erode it when the engine rotates so as to form a labyrinth seal, where the clearances are very small. This should substantially prevent any gas circulation through the reinforcements 10. However, reality is different, because successive machine servicing operations take place under always slightly differing conditions, particularly with regards to the position of the rotor with respect to the fixed blades 1 and the erosion of the wear material 13 continues, so that the clearance formed between the labyrinth seal is increased and leaks then occur. Moreover, cavities defined in the reinforcements 10 by the rings 3, the flanges 6 and the wear material 13 give rise to flow turbulence, even in the absence of leaks. Therefore this device suffers from disadvantages.

SUMMARY OF THE INVENTION

The present invention is original in that the seals carried by the rings extend up to the transverse faces of the reinforcements. More specifically, it is constituted by blade stages in an annular gas flow filament and a drum partly defining the filament and rotating with respect to the blades about an axis coinciding with a longitudinal direction of the filament, the blade stages being terminated by rings, which are flush in circular reinforcements of the drum defined by two transverse faces and is characterized in that the rings carry two circular slots each housing a seal, the slots being open towards one of the respective transverse faces and being provided with means for forcing the seal out of the slots and for pressing them against the transverse faces.

This assembly makes it possible to obtain a perfect seal between the annular filament and the reinforcements, which can no longer serve as an outlet for leaks. The seals are preferably located as near as possible to the walls defining the annular filament, so as not to produce there excessive variations of turbulence generating sections. They are moved away by means such as springs (particularly with a circular plate) towards the transverse faces and with an adequately low force to prevent excessive friction and corresponding wear and with an adequate flexibility to ensure that the effect of the variations of the longitudinal positions between the fixed and mobile parts is insensitive. With regards to the radial variations, they have no influence, because the joint only slides on the transverse faces.

An advantageous embodiment is obtained if the means for forcing back the seals are flexible, elastic, compressed bristles between the seal holder sliding in the slots and to which are fixed the seals and the bottoms of the slots. The flexible, elastic bristles can advantageously constitute the seals and extend up to the transverse faces.

Circular sealing seal or gaskets are already known which are subject to a longitudinal force in this field, but these are rigid seals having two concentric lips defining a chamber, which must be supplied with pressurized gas so that the lips do not rub on the transverse face in front of which they extend. Larger leaks than in the invention are consequently inevitable and the pressurized gas supply for each of these seals represents a costly operation.

The invention can be improved by having detachable abutments carried by the rings for retaining the seal in the slots in certain operating states, particularly during engine acceptance tests.

To obtain a better regulation of the position of the seals and more uniform stresses thereon, it may be decided to form the rings from two mutually mobile parts in the longitudinal direction of the filament, one being fixed to the blades and the other carrying the slots and the seals.

BRIEF DESCRIPTION OF THE DRAWINGS

The invention will be described in greater detail hereinafter relative to non-limitative embodiments and with reference to the attached drawings, wherein:

FIG. 5 illustrates another seal usable for the invention.

DESCRIPTION OF THE PREFERRED EMBODIMENTS

Figure 1:
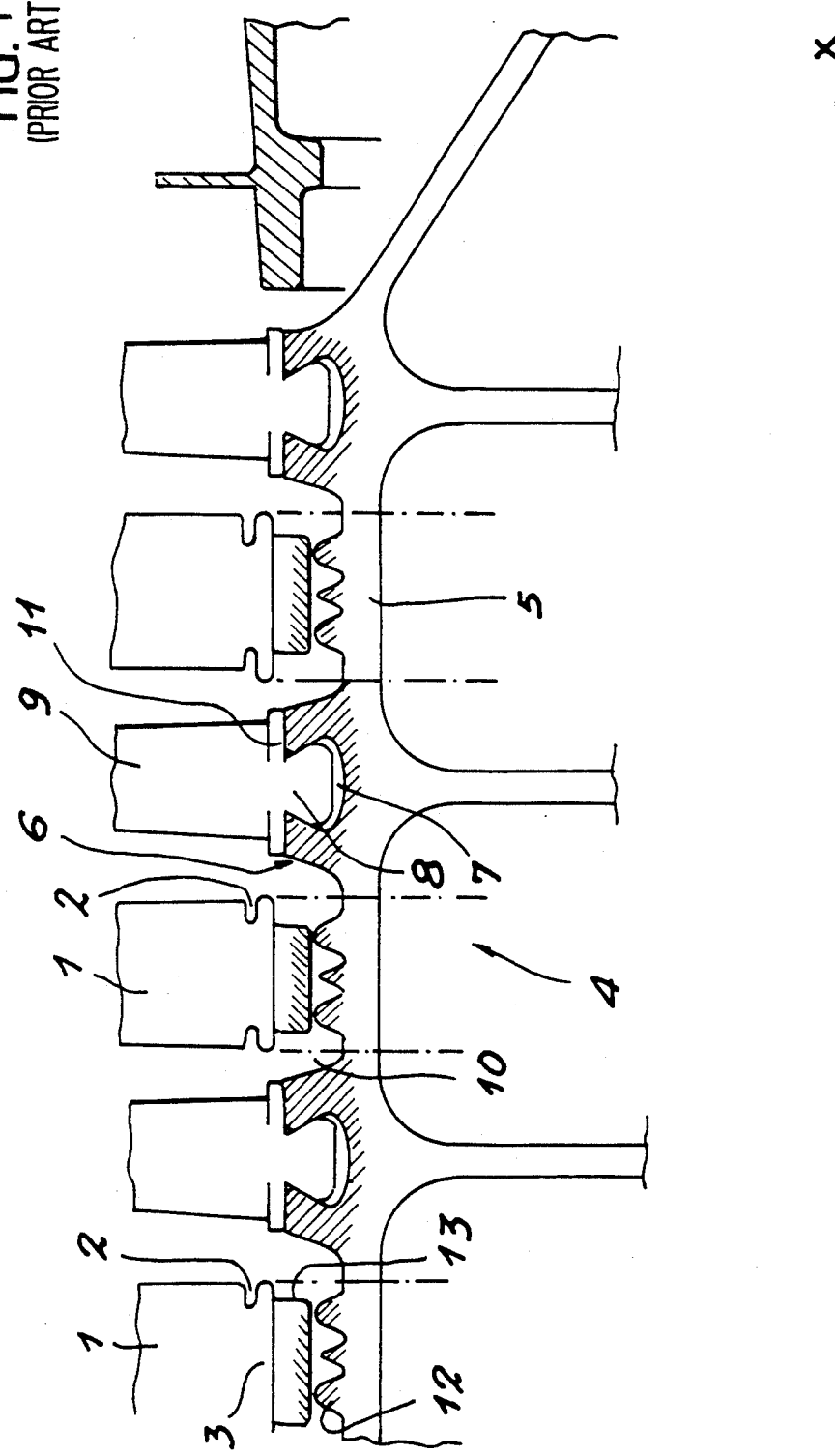
FIG. 1 illustrates the already described, prior art sealing device.
Figure 2:
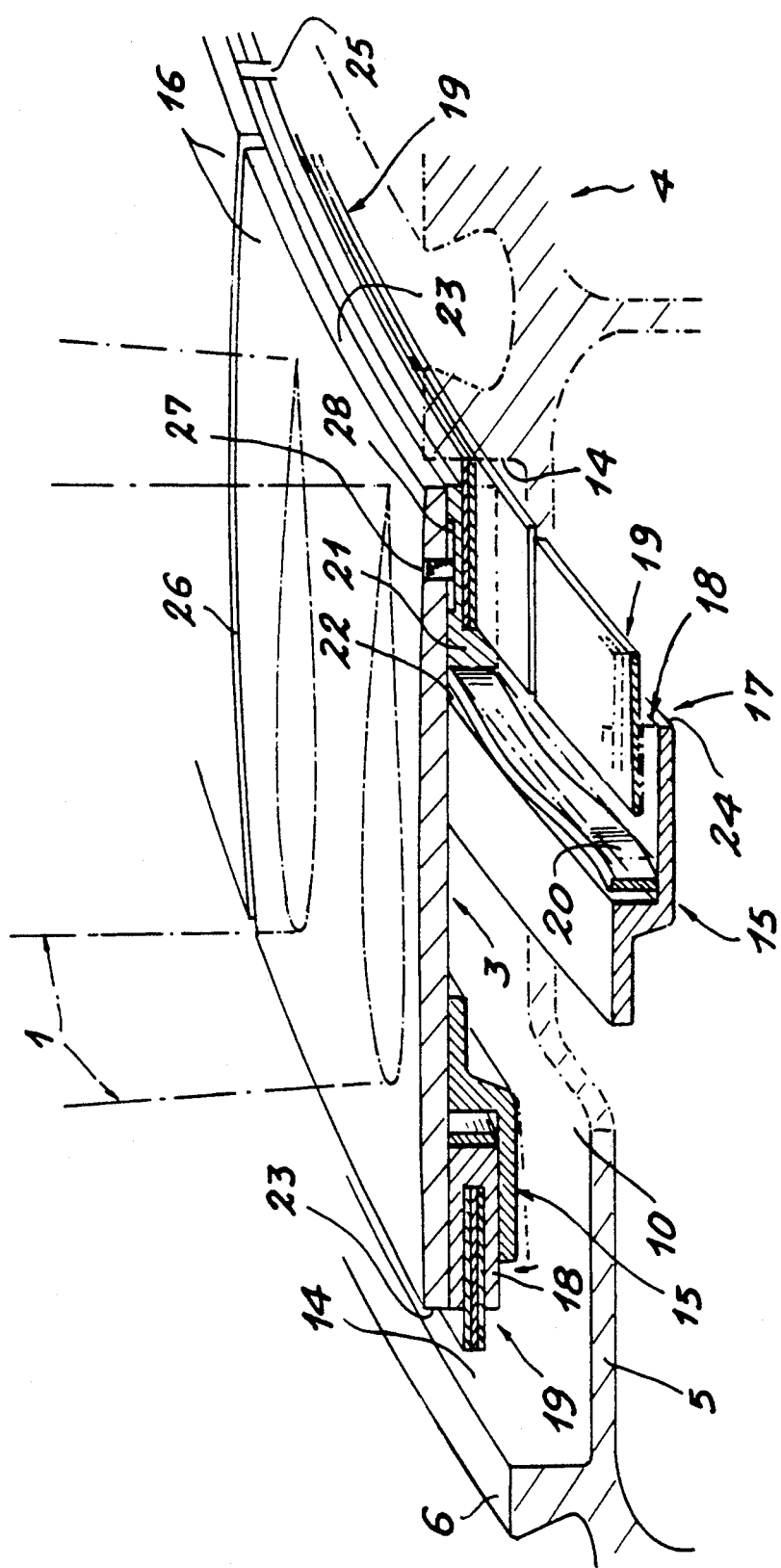
FIG. 2 illustrates a detailed view of the invention.

The reinforcements 10 of FIG. 2 have a smooth, flat bottom free from crests and are defined by two planar, circular transverse faces 14 of flanges 6. The straight (cylindrical or conical) ferrule 5 ensures a good uniformity of stresses. The rings 3 are essentially constituted by plates 16, which extend in front of the reinforcements 10 and virtually up to the transverse faces 14. The fixed blades 1 are connected to their external faces, while their internal faces carry flexible collars 15, which occupy part of the reinforcements 10 and can be in one piece with the plates 16 or welded thereto. The original shape of the collars 15 is rectilinear and oblique in a order to move away in clearly defined manner from the plates 16, as indicated by the dotted lines. They are then deformed during the assembly of the machine so as to be moved towards the plates 16 and so as to form therewith circular slots 17, which open towards the transverse faces 14. Each of the slots 17 receives a U-section seal holder 18, which contains a circular joint 19, whose free end projects beyond the seal holder 18 and the respective slot 17 in order to rub against one of the transverse faces 14. This is obtained by means of leaf springs 20 slid into the slots 17 between their bottom 22 and the bottom 21 of the seal holder 18. The application force of the seals 19 to the transverse faces 14 is defined by the dimensions of the parts and the stiffness of the springs 20. In the embodiment shown, the plates 16 have a longitudinal edge 23 extending beyond the longitudinal edge 24 of the collars 15. If there is a high pressure in the annular filament, it is advisable to reverse this relationship, so that the collars 15 support the seal holders 18.

Known means such as worm screws 27, which are detachable and are engaged in perforations of the plates 16 and whose end penetrates a longitudinal slot 28 of a seal holder 18 prevent the latter from rotating in the slots 17. The slots 28 can also serve as a longitudinal abutment for preventing the seals 19 from moving excessively out of the slots 17. It is then merely necessary to limit their length as a consequence thereof so that the worm screw 27 abuts against their end.

In practice, the seal holders 18, seals 19 and leaf springs 20 are subdivided into sectors in order to permit the installation of the machine. The gaps 25 between the seal holders and seals are then displaced with respect to those 26 separating the plates 16, so that at these locations there are no communications between the annular filament and the reinforcements 10. Other means and in particular other seals can be used for plugging those parts of the gaps 26 which are located between the sectors of the rings 3 positioned between the pairs of slots 17. The seals 19 can e.g. be of carbon, composite, metal braid, lamellas, brushes and other suitable materials. There is a wide choice, because they are flexibly fitted and with limited displacements and are consequently not pressed against the transverse faces 14 with a force which would bring about the premature wear thereof.

Figure 3:
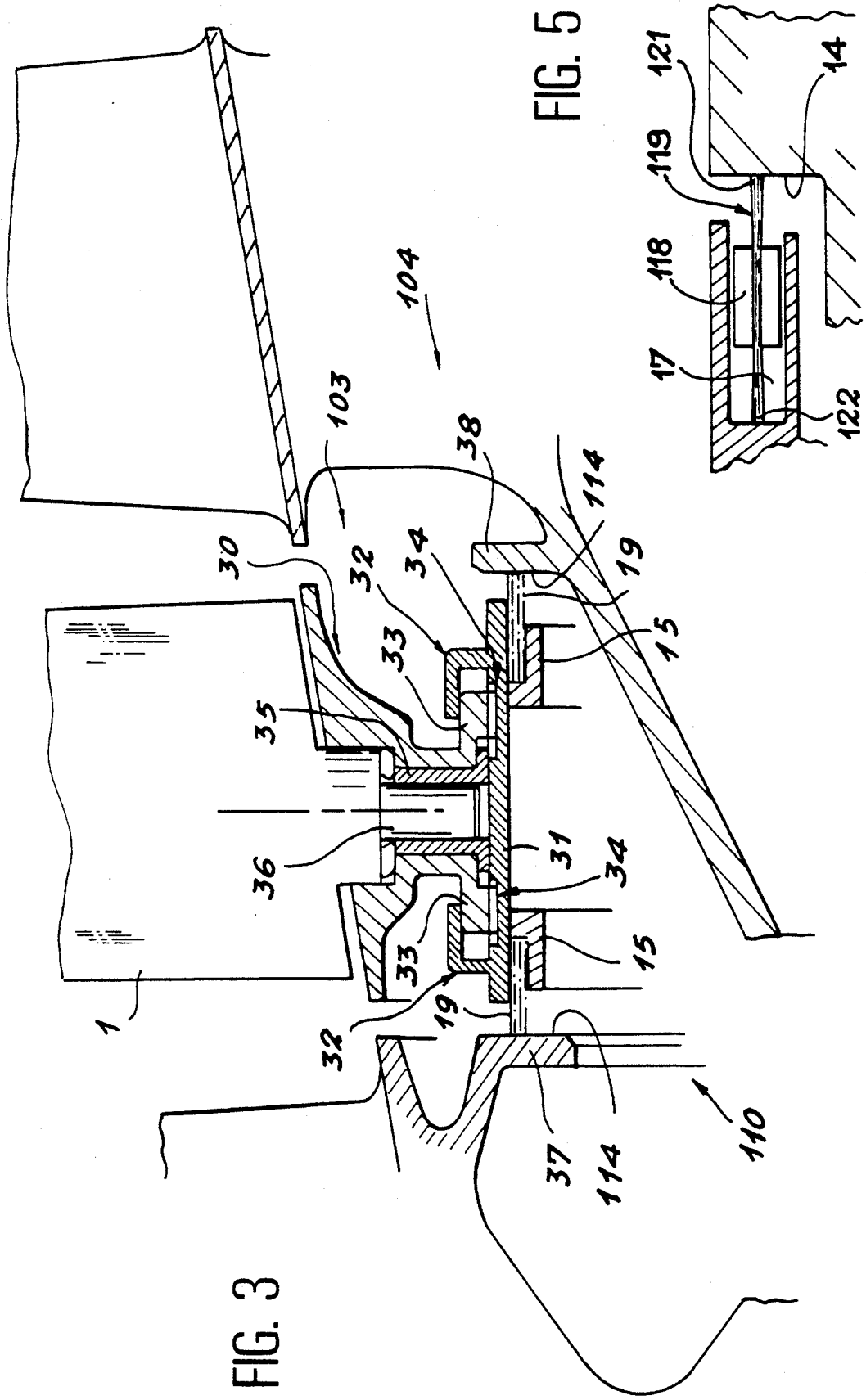
FIGS. 3 and 4 illustrate two special embodiments of the invention.
Figure 4:
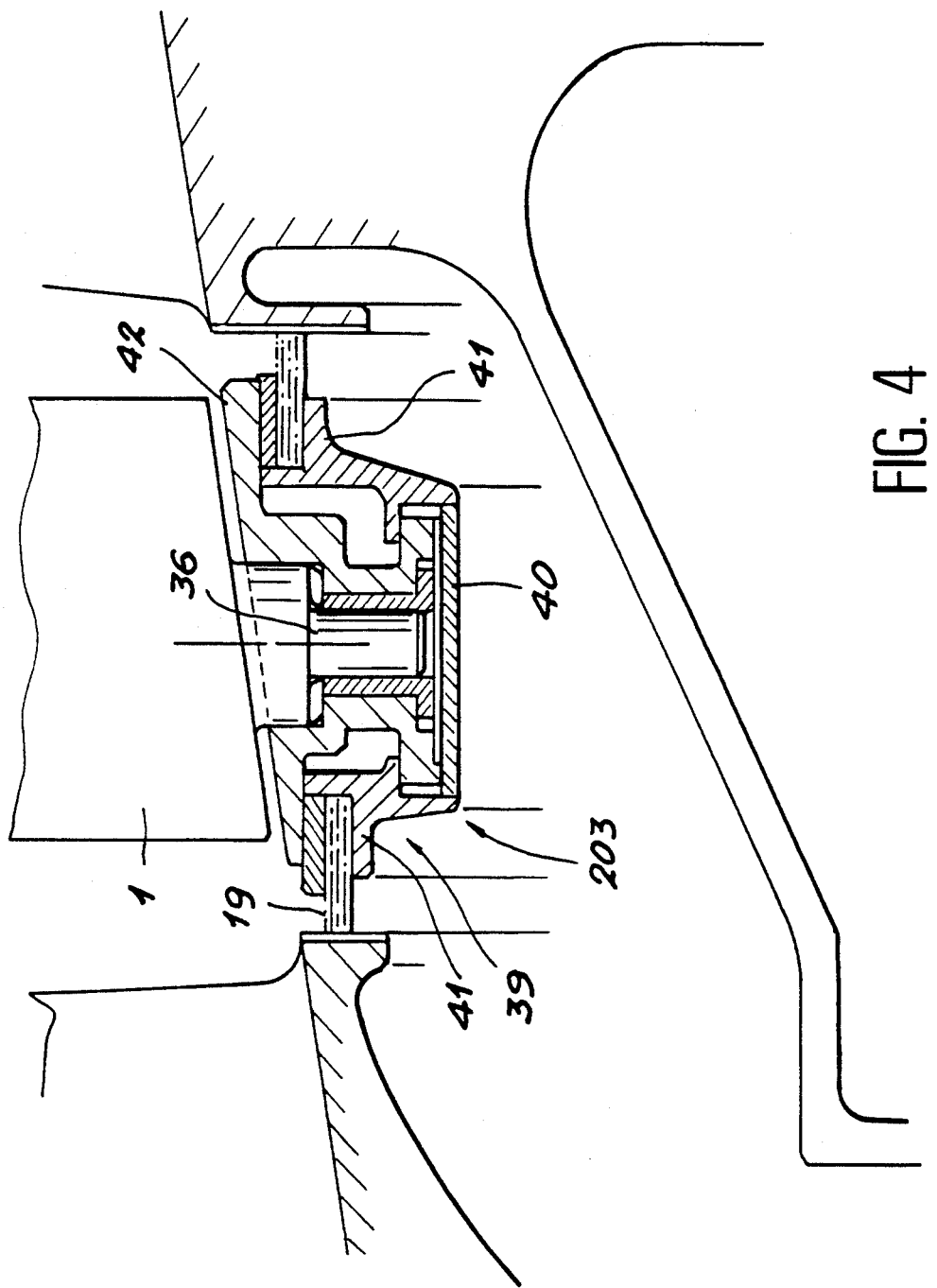

FIGS. 3 and 4 show two further embodiments of the invention where the rings are designated 103 and 203. They are constituted by two parts, namely a part 30 connected to the fixed blades 1 and a part 31 carrying the collars 15 and the seals 19. These two parts 30, 31 are reciprocately mobile in the longitudinal direction of the annular filament. To this end, the second part 31 is provided with angle sections 32, which secure between them sliding tubes 33 of the first part 30, while enabling the said tubes 33 to engage in their unevennesses and also partly pass out of the same. Splines 34 are provided between the two parts 30, 31 to prevent them from turning with respect to one another.

In this case the reinforcements 110 are deeper and the rings 103 and more specifically their first part 30 have a large radial extension, because the fixed blades 1 are pivotably mounted so that it is possible to vary their inclination in accordance with the machine operating conditions. The inclination control mechanism is placed around the fixed blade stages 1 and is consequently not visible in the drawings. The rings 103 merely have means to permit the pivoting of the fixed blades 1. Therefore the first parts 30 are arranged as a consequence of this and contain an anti-friction bushing 35 surrounding the pivot pin 36 of the fixed blades 1. Under these conditions, the transverse faces 114 of the rotor 104 on which the seals 19 rub are not established in the immediate vicinity of the annular filament and are instead at a certain radial distance therefrom, on the radial orientation, circular projections 37 or 38 and which can be directed towards the inside or the outside, as a function of the particular case. Much larger volumes then exist between the annular filament and the seals 19, but the undesirable flows and turbulences are avoided to a very considerable extent due to the tight seals obtained as a result of the seals 19.

The device of FIG. 4 is slightly different. The seals 19 are brought close to the annular filament, so that the mobile part carrying the rings 203 is constituted by an inner plate 40 and two seal holder rings 41, which extend at the level of the pivot pin 36. A slide system for the mobile part 39 with respect to the fixed part 42 of the rings 203 and constructed substantially as part 30, makes it possible to compensate deformations in the machine in order to bring about an identical force or stress on the two seals 19.

FIG. 5 illustrates seals of a type different from those of FIG. 2 and which they can replace. The springs 20 are omitted and the seals 119 are here constituted by a border of flexible bristles fixed to the seal holder 118, whereof one edge 121 rubs against the transverse faces 14 and whereof the other edge 122 touches the bottom of the slots 17 (the seal 19 of the embodiment of FIG. 2 could be made from other products and in particular have continuous flexible, elastic material lips). In this case the seal holders 118 slide even more freely in the slots 17. The advantages of this arrangement are an even better sealing action, an easier choice of the pressing force for the seals and a greater tolerance with respect to the axial displacements between the rotor and stator of the machine.

Thus, the gas flows in the interior of the slots are opposed by the edge 122, which serves as a static seal. It is possible to reduce the compression of the bristles, by cutting the desired length from their ends prior to fitting them in the slots 17. The axial displacements of the rotor in the stator have repercussions on the seals by a bending of the bristles, which produces an elastic force varying only slightly as a function of the bending action, contrary to what occurs in numerous conventional springs. The importance of this force is in particular dependent on the free length of the bristles of the side of the edge 122.

A corollary of the latter effect is that the contact pressure of the seals 119 on the transverse faces 14 is not very sensitive to the axial displacements of the rotor in the stator and the braking risks of the rotor by the seals are considerably reduced, even when the seals 119 are highly compressed.

These various embodiments can obviously be used side by side on different stages of the same means.

What is claimed as new and desired to be protected by Letters Patent of the United States is:

1. A device constituted by blade stages in an annular gas flow path and a drum partly defining the path and rotating with respect to the blades about an axis coinciding with a longitudinal direction of the path, the blade stages being terminated by rings which are flush in circular reinforcements of the drum defined by two transverse faces, wherein the rings carry two circular slots, each of the slots housing a seal, each respective slot being open towards a respective transverse face and being out of the slots and pressing them against the transverse faces.

2. A device according to claim 1, wherein the means for forcing back the seals are leaf springs located at a bottom of the slots.

3. A device according to claim 1, wherein the rings carry detachable abutments for maintaining the seals in the slots.

4. A device according to claim 1, wherein the slots are defined by two edges of different heights.

5. A device according to claim 1, wherein the slots are defined by first and second edges and the rings incorporate flexible collars located within the reinforcements in order to form one of the edges of the slots.

6. A device according to claim 1, wherein the rings are made of two parts mutually mobile in the longitudinal direction of the path, one of said parts being fixed to the blades and the other of said parts carrying the slots.

7. A device according to claim 1, wherein the blades are mounted in a pivoting manner on the rings.

8. A device according to claim 1, further comprising seal holders which are slidable in the slots, the seals being fixed to said seal holders, wherein the means for forcing back the seals are flexible, elastic bristles, compressed between said seal holders sliding in the slots and to which the seals are fixed, and bottoms of the slots.

9. A device according to claim 8, wherein the flexible, elastic bristles constitute the seals and extend up to the transverse faces.

* * * * *